(12) United States Patent
Kikuchi et al.

(10) Patent No.: US 8,123,261 B2
(45) Date of Patent: Feb. 28, 2012

(54) LID LOCK STRUCTURE OF STORING BOX FOR VEHICLE

(75) Inventors: Masami Kikuchi, Saitama (JP); Takatoshi Chiba, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 411 days.

(21) Appl. No.: 12/310,497

(22) PCT Filed: Dec. 14, 2007

(86) PCT No.: PCT/JP2007/074115
§ 371 (c)(1),
(2), (4) Date: Feb. 26, 2009

(87) PCT Pub. No.: WO2008/075622
PCT Pub. Date: Jun. 26, 2008

(65) Prior Publication Data
US 2010/0001539 A1 Jan. 7, 2010

(30) Foreign Application Priority Data
Dec. 21, 2006 (JP) .................................. 2006-344287

(51) Int. Cl.
*E05C 1/06* (2006.01)
(52) U.S. Cl. .................. 292/138; 292/137; 292/DIG. 22
(58) Field of Classification Search .................. 292/121, 292/109, 32, 138; 296/37.12; 70/208
See application file for complete search history.

(56) References Cited

U.S. PATENT DOCUMENTS

| | | | | |
|---|---|---|---|---|
| 4,552,399 A | * | 11/1985 | Atarashi | 296/37.12 |
| 5,808,214 A | * | 9/1998 | Kaneko et al. | 75/246 |
| 5,868,448 A | * | 2/1999 | Izumo | 296/37.1 |
| 6,854,728 B2 | * | 2/2005 | Oister et al. | 273/108.1 |
| 7,065,829 B2 | * | 6/2006 | Okabayashi et al. | 16/51 |
| 7,571,948 B2 | * | 8/2009 | Suh | 296/37.12 |
| 7,862,096 B2 | * | 1/2011 | Kim et al. | 296/37.12 |
| 2003/0052129 A1 | * | 3/2003 | Fukuo | 220/350 |

FOREIGN PATENT DOCUMENTS

| | | |
|---|---|---|
| CN | 1480616 | 3/2004 |
| JP | 5-66176 | 8/1993 |
| JP | 2532003 | 4/1997 |
| JP | 5-47234 | 12/1999 |
| JP | 2004-092340 | 3/2004 |

OTHER PUBLICATIONS

International Search Report issued Feb. 26, 2008 in the International (PCT) Application of which the present application in the U.S. National Stage.

* cited by examiner

*Primary Examiner* — Kristina Fulton
(74) *Attorney, Agent, or Firm* — Wenderoth, Lind & Ponack, L.L.P.

(57) ABSTRACT

A lid lock structure of a storing box for a vehicle includes an elongated sliding hole formed in an arm portion for rotatably connecting a lid to a box main body. A slide restraining device, when force (F5) acts in a sliding direction on a slider configured to be slidable along the elongated sliding hole, restrains the slider from sliding if the magnitude of the force (F5) is not larger than a predetermined value, and releases the slider from the restrained state if the magnitude of the force (F5) is larger than the predetermined value. A twist spring causes the slider to quickly slide from an end portion R side to an end portion L side of the elongated sliding hole when the slider is released from the restrained state; and a stopper portion restrains an arm portion from rotating in a direction in which the lid opens, by locking the slider when the slider is located in the end portion L side of the elongated sliding hole.

2 Claims, 10 Drawing Sheets

FIG.1  PRIOR ART

TOWARD FRONT OF VEHICLE BODY

LID LOCK STRUCTURE OF STORING BOX FOR VEHICLE

TECHNICAL FIELD

The present invention relates to a lid lock structure of a storing box for a vehicle, which is capable of preventing a lid of a storing box provided in a vehicle from opening due to an impact force produced by a vehicle collision or the like.

BACKGROUND ART

A lid lock structure of a storing box for a vehicle for preventing a lid of a storing box provided in a vehicle from opening due to impact force produced by a vehicle collision or the like has been known heretofore (for reference, see Japanese Examined Utility Model Publication No. Hei. 5-47234).

Figure 1:
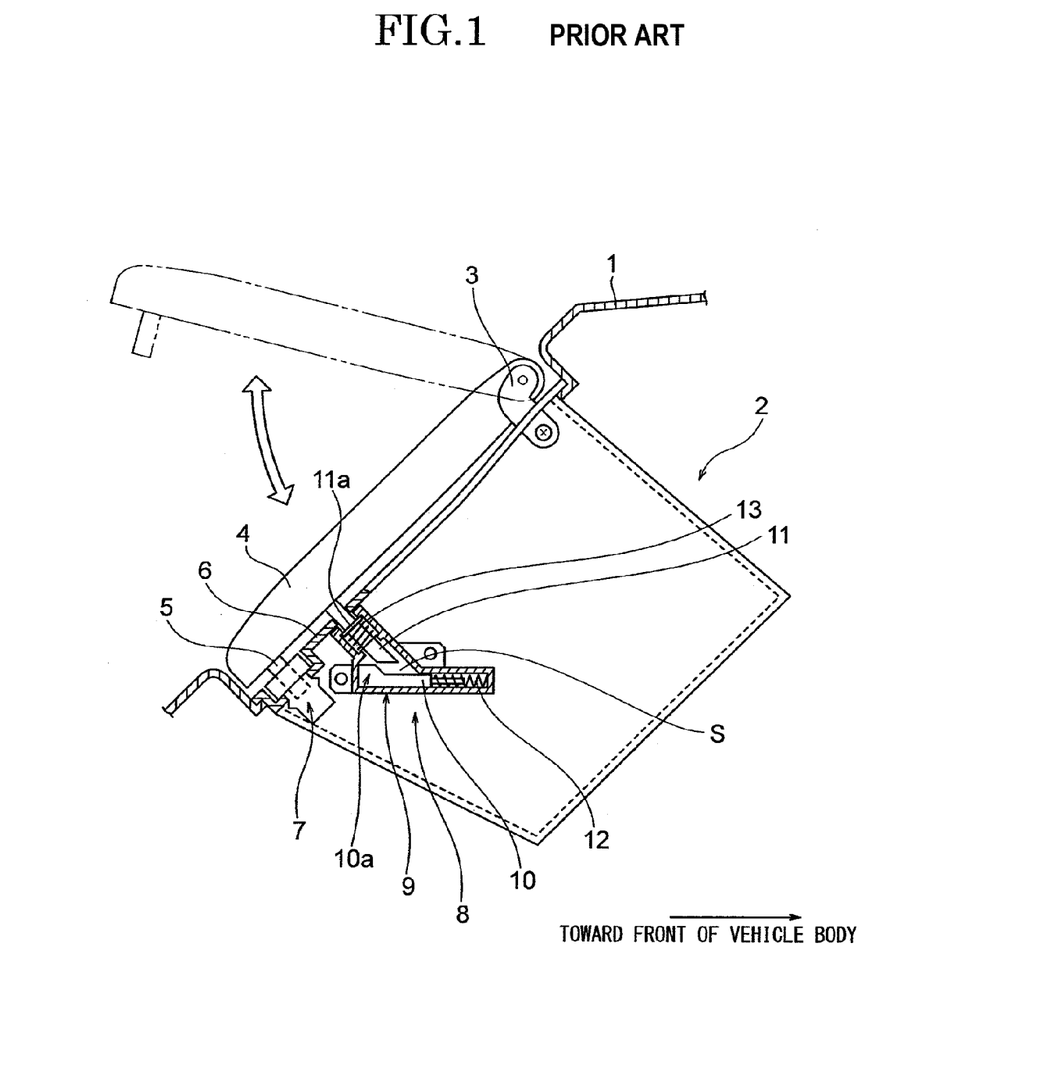
FIG. 1 is a cross-sectional side view of a storing box including a conventional lid lock structure of a storing box for a vehicle.
Figure 2A:
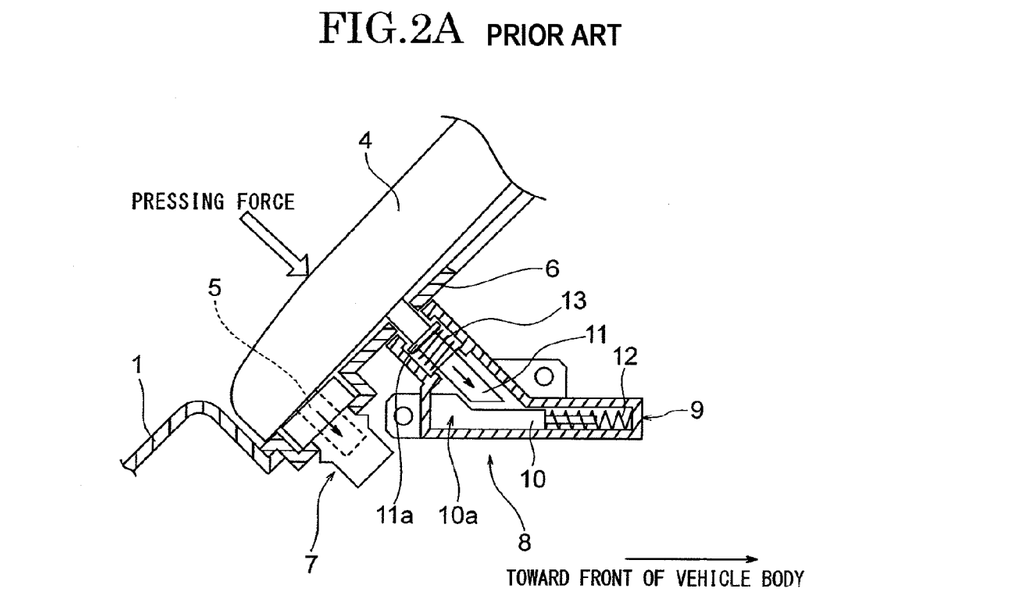
FIG. 2A is a cross-sectional side view of the conventional lid lock structure of a storing box for a vehicle, showing how the front side of a closed lid is pressed by the vehicle passenger.
Figure 2B:
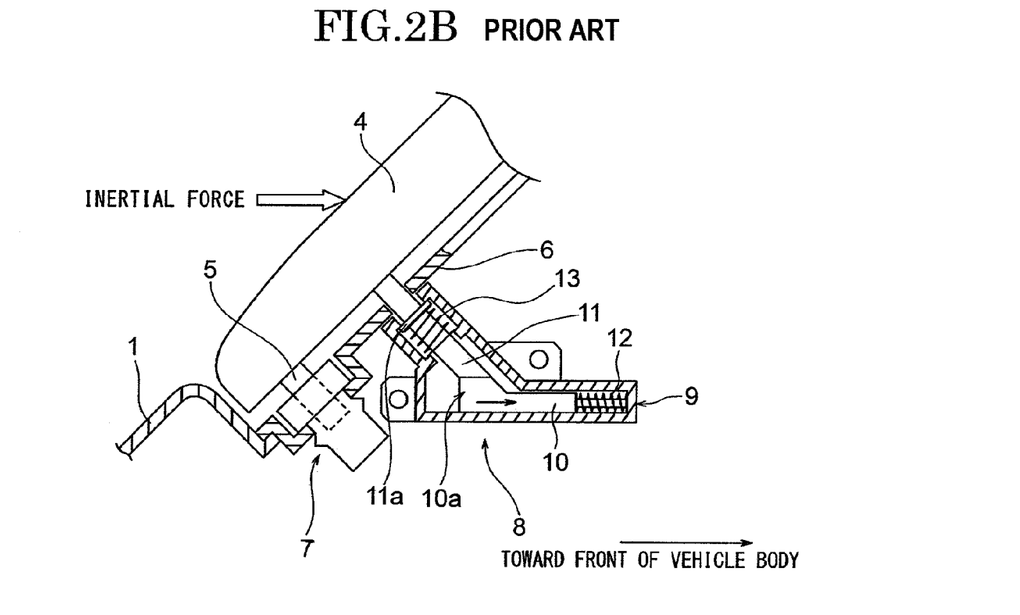
FIG. 2B is a cross-sectional side view of the conventional lid lock structure of a storing box for a vehicle, showing how the lid lock structure restrains the lid from descending, and prevents the lid from being released from the lock state, at a time of a vehicle collision.

FIGS. 1 and 2 illustrate a conventional lid lock structure of a storing box for a vehicle. In FIG. 1, reference numeral 1 denotes an instrument panel, and reference numeral 2 denotes a storing box provided in the instrumental panel 1.

Paired hinge brackets 3 are provided in the respective two sides of an upper part of an opening part of the storing box 2. Two end parts of an upper part of a lid 4 are rotatably attached to these hinge brackets 3. Thus, the lid opens and closes the opening part of the storing box 2.

Paired engagement pin portions 5 are formed in a lower part of the rear of the lid 4. Attachment flanges 6 are formed in two sides of the opening part of the storing box 2.

Paired lock devices 7 are provided in lower parts of the attachment flanges 6, and their provided locations correspond to the engagement pin portions 5. One of the attachment flanges 6 is provided with a restriction device 8 above its lock device 7.

Each lock device 7 has what is termed as a push latch mechanism. When the lid 4 is repeatedly pushed from its front side while the lid 4 is closed, the push latch mechanism causes the lock device 7 to alternately repeat a state of holding the engagement pin portion 5 and a state of releasing the engagement pin portion 5, each time the lid 4 is pushed.

By this push latch mechanism, a locked state of the lid 4 and an unlocked state of the lid 4 are alternately switched, each time the lid 4 is pushed repeatedly.

The concrete structure of the push latch mechanism is based on the art which has been publicly known heretofore. For this reason, further description thereof will be omitted.

The restriction device 8 is configured of a case portion 9, a weight portion 10, a stopper portion 11, and springs 12 and 13.

The weight portion 10 is slidably supported in the vehicle front-rear direction in the case portion 9. The stopper portion 11 is formed above the case portion 9, and is supported movably in ascending-descending directions inside a cylinder portion extending in the directions which the lid 4 opens and closes.

The spring 12 is fitted onto the front end part of the weight portion 10. The spring 13 is fitted onto a center part of the stopper portion 11.

In a normal condition in which no impact force is applied to the vehicle, the weight portion 10 is biased rearward of the vehicle body by the spring 12, and thus a swelling portion 10a formed on the upper side of a rear end part of the weight portion 10 is located behind a lower end part of the stopper portion 11. In addition, since the stopper portion 11 is biased upward by the spring 13 using a collar portion 11a, the lower end part of the stopper portion 11 is located above the swelling portion 10a of the weight portion 10.

In this state, an upper end part of the stopper portion 11 penetrates a hole provided in the attachment flange 6, and thus protrudes upward. When the lid 4 is closed, the upper end part of the stopper portion 11 is in contact with the rear side of the lid 4.

In this case, since there is a space S between the lower end part of the stopper portion 11 and the weight portion 10, the stopper portion 11 and the weight portion 10 do not interfere with each other even if the lid 4 is pushed. Thus, the lid 4 can be pushed.

Consequently, as shown in FIG. 2A, it is possible to lift down the engagement pin portions 5 in the direction indicated by an arrow in the drawing by pushing the closed lid 4. Each time the lid 4 is pushed, the state of holding the engagement pin portions 5 and the state of releasing the engagement pin portions 5 are alternately changed repeatedly. Correspondingly, the locked state of the lid 4 and the unlocked state of the lid 4 are switched back and forth.

Meanwhile, in a case where impact force acts on the vehicle from the front of the vehicle body due to a vehicle collision or the like while the lid 4 is locked by the lock devices 7, inertial force acts on the lid 4 toward the front of the vehicle body, and thus the lid 4 moves toward the front of the vehicle body as shown in FIG. 2B, as in the case where the lower part of the lid 4 is pushed.

In this event, since the inertial force simultaneously acts on the weight portion 10 and the lid 4, the weight portion 10 slidingly advances toward the front of the vehicle body, and thus the swelling portion 10a moves to a position below the stopper portion 11. For this reason, the lower end part of the stopper portion 11 hits an upper surface of the swelling portion 10a.

Thereby, the descending movement of the stopper portion 11 is blocked, which in turn blocks the descending movement of each engagement pin portion 5, and prevents the lock devices 7 from releasing the engagement pin portions 5 from their lock states. Consequently, even if the impact force acts on the vehicle from the front of the vehicle body due to the vehicle collision or the like, the lid 4 does not open.

Meanwhile, when impact force acts on a vehicle due to a vehicle collision or the like, acceleration occurs in every object inside the vehicle along with input of this impact force into the vehicle. This acceleration varies depending on factors such as an amount of impact force produced at a time of collision, and colliding manner.

In the conventional lid lock structure of a storing box for a vehicle, the weight portion 10 and the spring 12 are connected together. Thus, the sliding movement of the weight portion 10 due to inertial force produced at the time of the collision is damped by elastic force of the spring 12.

In such conventional structure, the weight portion 10 has a peculiar movement characteristic determined by the mass of the weight portion 10 and the strength of the spring 12. For this reason, the weight portion 10 starts its sliding movement in sensitive response to a particular level of acceleration produced at the time of a collision, but is less likely to show a response to a different level of acceleration. Thus, with some level of impact force and some way of collision, the weight portion 10 may not slide to such a location that the stopper portion 11 is prevented from moving downward.

If the weight portion 10 does not slide to such a location that the descending movement of the stopper portion 11 is prevented as described above, it is likely that: the stopper portion 11 descends; in response to this, the engagement pin portions 5 descend; the lock devices 7 release the lock; and consequently, the lid 4 opens.

Furthermore, in the conventional structure, it is difficult to set conditions for the operation of the restriction device 8. That is because consideration needs to be given to the movement characteristic peculiar to each of the weight portion 10 and the spring 12 when the operation conditions of the restriction device 8 are set.

Moreover, in the conventional structure, even if the operation conditions of the restriction device 8 are changed by changing the mass of the weight portion 10 and the strength of the spring 12, nothing but the level of acceleration to which the weight portion 10 sensitively responds is changed. This brings about a problem that the weight portion 10 still sensitively responds to a particular level of acceleration, whereas the weight portion 10 is hard to respond to a different level of acceleration, and thereby the restriction device 8 does not operate in some cases depending on impact force and how the vehicle collides.

Against this background, an object of the present invention is to provide a lid lock structure of a storing box for a vehicle which allows operation conditions to be set easily, and which is capable of securely locking the lid of the storing box, when the vehicle receives impact force due to a vehicle collision or the like, regardless of a level of acceleration produced at a time of the vehicle collision.

SUMMARY OF THE INVENTION

For the purpose of attaining the object, a lid lock structure of a storing box for a vehicle according to an example of the present invention includes: a storing box main body of the storing box for a vehicle, which is provided in a vehicle; a lid provided to be capable of opening and closing an opening portion of the storing box main body; a lock device for alternately switching a state of the lid, while the lid closes the opening portion of the storing box main body, between a locked state in which the lock device locks the lid and a released state in which the lock device releases the lid from the lock state; an opening-direction biasing device for biasing the lid in an opening direction in which the lid opens when the lock device unlocks the lid; a supporting device for connecting the lid and the storing box main body together in a relatively rotatable and slidable manner; a slide restraining device for restraining the lid from sliding if the magnitude of force acting on the lid in a sliding direction is not larger than a predetermined value, and for releasing the lid from the restrained state if the magnitude of the force acting on the lid in the sliding direction is larger than the predetermined value; a slide biasing device for biasing the lid in order to slide the lid when the slide restraining device releases the lid from the restrained state; and a rotation restraining device for restraining the lid from rotating in the opening direction.

When impact force equal to or larger than a specific value acts on the vehicle due to a vehicle collision or the like, force acting on the lid causes the slide restraining device to release the lid from the restrained state.

The lid lock structure of a storing box for a vehicle further includes a return preventing device for preventing the slider from being pushed back from a second end side of the elongated hole in its longitudinal direction to a first end side of the elongated hole in its longitudinal direction when the rotation restraining device restrains the slider, the return preventing device being provided in the second end side of the elongated hole.

DETAILED DESCRIPTION OF THE INVENTION

Detailed descriptions will be provided hereinbelow for a best mode of the present invention on the basis of an embodiment for embodying the present invention by referring to the drawings.

EXAMPLE

Figure 3:
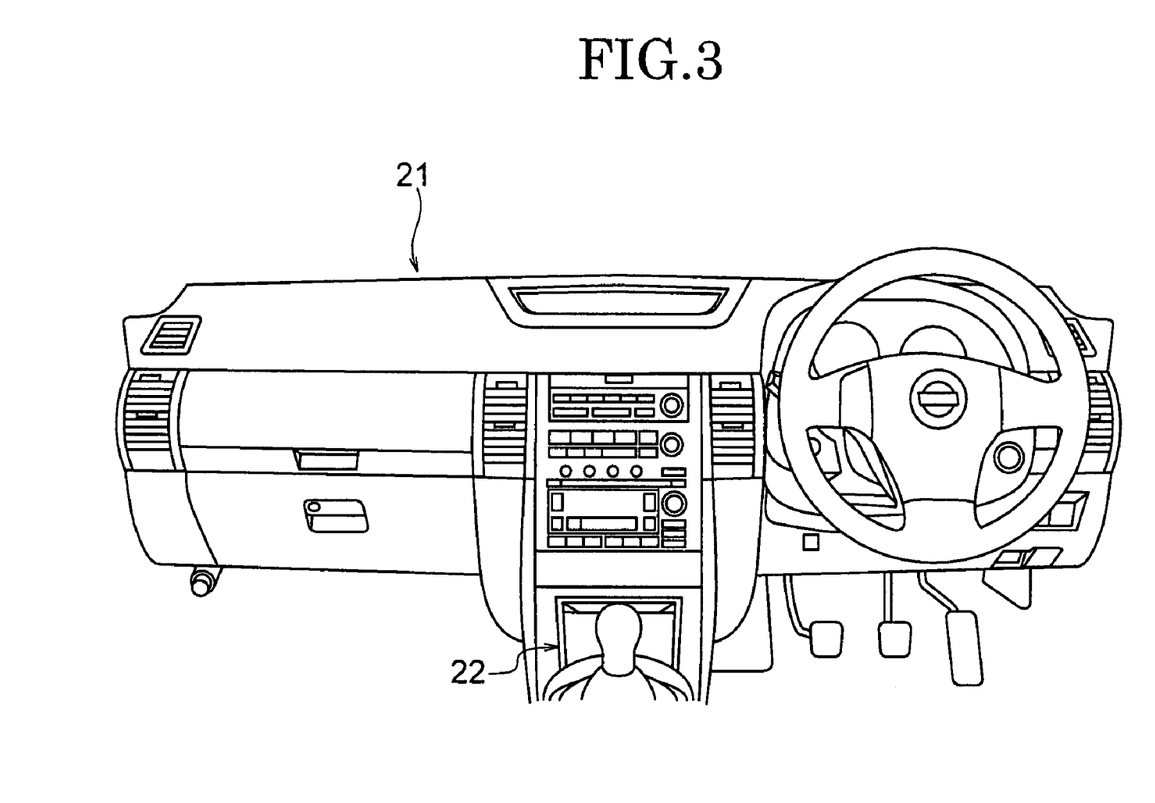
FIG. 3 is a front view of a vehicle instrument panel related to a lid lock structure of a storing box for a vehicle according to an embodiment of the present invention.
Figure 4:
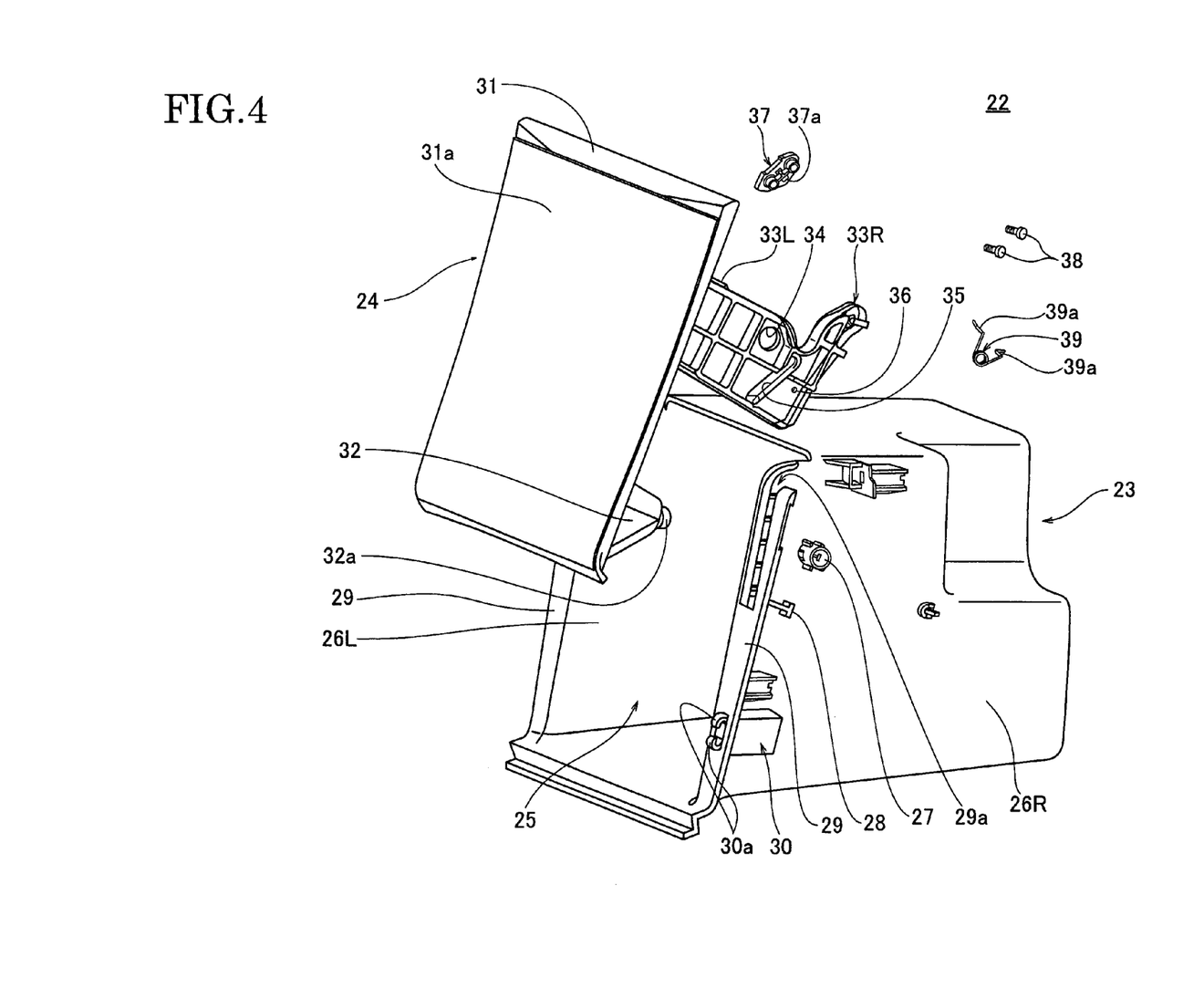
FIG. 4 is an exploded perspective view of a center lower box related to the lid lock structure of a storing box for a vehicle according to the embodiment.
Figure 5:
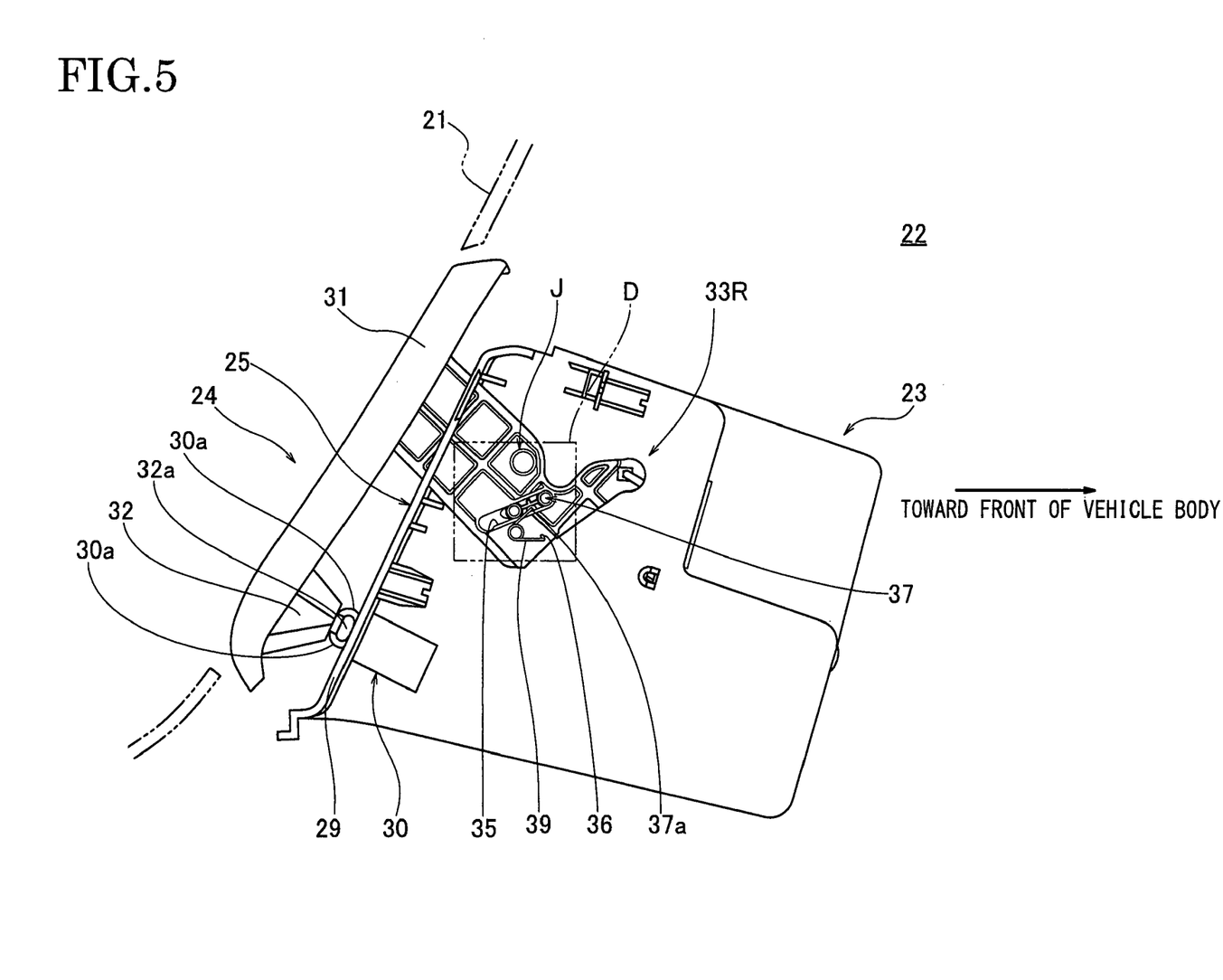
FIG. 5 is a side view of the center lower box related to the lid lock structure of a storing box for a vehicle according to the embodiment.

In particular, FIGS. 3 to 5 show a lid lock structure of a storing box for a vehicle according to the present invention. In FIG. 3, reference numeral 21 denotes a vehicle instrument panel, and reference numeral 22 denotes a center lower box for storing small items which is provided in this instrument panel.

As shown in FIG. 4, the center lower box 22 is configured of a box main body 23 and a lid 24. The box main body 23 is fixed to a center lower part of the instrument panel 21 in a way that an opening portion 25 of the box main body 23 is oriented rearward of the vehicle body.

The lid 24 is rotatably attached to the box main body 23. The lid 24 is designed to open and close the opening portion 25 of the box main body 23 by pivotally rotating the lid 24 with respect to the box main body 23.

Paired cylinder-shaped shaft portions 27 and 27 for rotatably supporting the lid 24 are integrally formed on the outer surfaces of the sidewalls 26R and 27L constituting the box main body 23, respectively. The paired cylinder-shaped shaft portions 27 and 27 are provided to stand outward respectively from their opposed locations on the sidewalls 26L and 26R.

In addition, a stopper portion 28 which is shaped like a letter T when viewed from the side is integrally formed on the outer surface of the sidewall 26R in the vicinity of the corresponding cylinder-shaped shaft portion 27. The stopper portion 28 restrains the lid 24 from opening when impact force is inputted into the vehicle body.

Paired flange portions 29 and 29 extending in the vertical direction are provided in the respective two sides of the opening portion 25 in such directions that the paired flange portions 29 and 29 become farther from each other. Notch portions 29a and 29a elongated in the vertical direction are formed in the upper inner locations in the flange portions 29 and 29, respectively, in order to avoid the interference of the flange portions 29 and 29 with the lid 24.

A lock device 30 for keeping the lid 24 closed when the lid 24 is closed is provided in a lower part of one flange portion 29 located in the right when viewed from the front.

The lock device 30 includes paired claw portions 30a and 30a. The paired claw portions 30a and 30a are attached to the above-described one of the flange portions 29 in a way to protrude toward the closed lid 24 from a hole formed in the flange portion 29.

The lid 24 is configured, for example, of a lid portion main body 31, paired spacer portions 32 and 32, and paired arm portions 33L and 33R.

The paired spacer portions 32 and 32 swell out in mountain chevron shape from the lower rear side of the lid portion main body 31. The paired arm portions 33L and 33R are arranged in a way to extend almost in parallel to each other, from the upper rear side of the lid portion main body 31.

A decorative panel 31a is attached to the front side of the lid portion main body 31. In the front end part of the spacer portion 32 on the right side when viewed from the front, a protrusion portion 32a is formed to face the rear side of the lid portion main body 31.

The protrusion portion 32a is held by the paired claw portions 30a and 30a provided in the lock device 30. Thereby, the lid 24 is locked to the above-described one of the flange portions 29.

The lock device 30 includes a lock mechanism such as what is termed as a push latch mechanism. This push latch mechanism is configured so that: if the lid 24 is repeatedly pushed from the front side of the lid 24 while the lid 24 is closed, the lock device 30 alternately repeats a state of holding the protrusion portion 32a and a state of releasing the protrusion portion 32a from the holding state, each time the lid 24 is pushed; and in response to this, a locked state of the lid 24 and a unlocked state of the lid 24 are alternately switched.

A concrete mechanism of such push latch mechanism is based on the conventional art which has been known widely. For this reason, descriptions for the push latch mechanism will be omitted.

Shaft bearing holes 33 and 33 are formed in the arm portions 33L and 33R, respectively. The cylinder-shaped shaft portions 27 and 27 provided on the sidewalls 26L and 26R are fitted into the shaft bearing holes 33 and 33 in a way that the shaft bearing holes 33 and 33 are rotatable. Thereby, the arm portions 33L and 33R rotatably connect the lid 24 and the box main body 23 together.

As shown in FIG. 5, the rotatable fitting of the cylinder-shaped shaft portion 27 into the shaft bearing hole 33 forms a shaft unit J.

As an opening-direction biasing device for biasing the lid 24 in a direction in which the lid 24 opens when the lock device 30 unlocks the lid 24, a spring (whose illustration is omitted) is provided in the vicinity of each shaft unit J.

An elongated sliding hole 35 and a spring hole 36 are formed in the arm portion 33R. The elongated sliding hole 35 extends almost in the front-rear direction of the vehicle body while the lid 24 is closed.

A slider 37 is slidably attached to the elongated sliding hole 35 by use of paired screws 38 and 38 (see FIG. 4). Pressing shaft portions 39a and 39a of a twist spring 39 are rotatably fitted into the spring hole 36 formed in the arm portion 33R and a spring hole 37a formed in the slider 37, respectively. A supporting device for connecting the lid 24 to the storing box main body 23 in such a way that the lid 24 is capable of sliding and rotating relative to the storing box main body 23 is configured of: the paired arm portions 33L and 33R; the elongated sliding hole 35 which is formed in at least one of these arm portions and which extends almost in the front-rear direction of the vehicle body while the lid 24 is closed; and the slider 37 attached to this elongated hole so as to be slidable along the elongated hole. Nonetheless, the components for this supporting device are not limited to the above-mentioned members such as the arm portions and the slider. The supporting device may be configured of other members as needed.

The slider 37 slides along the elongated sliding hole 35 when impact force is inputted into the vehicle, and thus restrains the arm portion 33R from rotating in cooperation with the stopper portion 28.

Figure 6A:
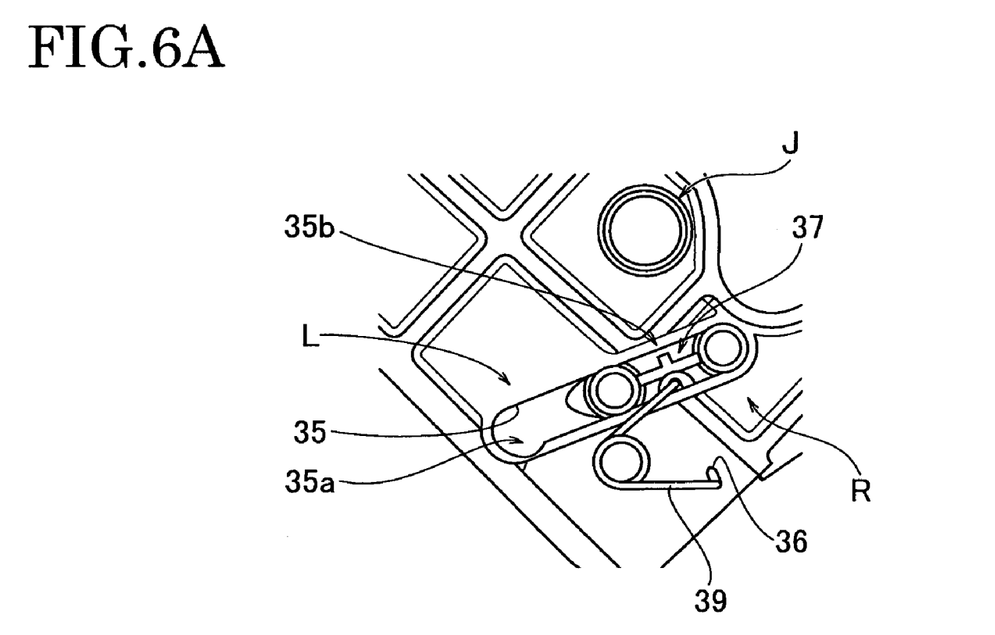
FIG. 6A is a view of a D part of the center lower box shown in FIG. 5, which is viewed from the front side of an arm portion.

As shown in FIG. 6A, a return preventing concave portion 35a is provided in an end portion L of the elongated sliding hole 35, the end portion L being located closer to the lid portion main body 31.

The return preventing concave portion 35a prevents the slider 37 from being pushed back along the elongated sliding hole 35 when the slider 37 is locked by the stopper portion 28.

Figure 6B:
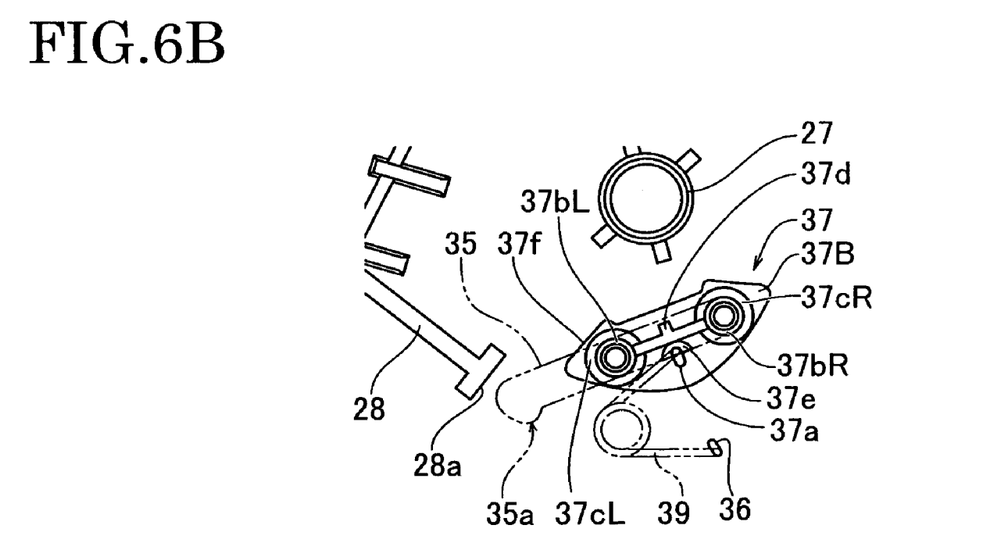
FIG. 6B is a view of the D part shown in FIG. 6A, excluding the arm portion.

As shown in FIG. 6B, the slider 37 is configured of a slider main body portion 37B, paired cylindrical portions 37bL and 37bR, paired step portions 37cL and 37cR, a pinch portion 37d, a semi-cylindrical portion 37e and a contact surface 37f.

The cylindrical portions 37bL and 37bR are installed adjacent to each other in the slider main body portion 37B in the sliding direction, and are slidably fitted into the elongated sliding hole 35.

The step portions 37cL and 37cR are respectively provided surrounding the cylindrical portions 37bL and 37bR, and are in contact with the rear surface of the side edge portion of the elongated sliding hole 35.

The pinch portion 37d is bridged between the cylindrical portions 37bL and 37bR. The pinch portion 37d is designed to be held when the slider 37 is set in an end portion R side of the elongated sliding hole 35.

The semi-cylindrical portion 37e is provided to stand on a constituting wall of the spring hole 37a on the pressed side, and receives pressing force produced by the pressing shaft portion 39a of the twist spring 39.

The contact surface 37f is formed in an end edge of the slider 37 which is closer to the cylindrical portion 37bL. When slider 37 is locked by the stopper portion 28, the contact surface 37f comes into contact with a stopper surface 28a of the stopper portion 28.

A slide restraining device is configured, for example, of a constituting wall 35a of the elongated sliding hole 35, the slider 37, and the twist spring 39.

When force acts on the slider 37, this slide restraining device restrains the slider 37 from sliding if the magnitude of a sliding-direction component of the force acting on the slider 37 is equal to or lower than a predetermined value (the magnitude of a maximum static friction force), and releases the slider 37 from the restrained state if the magnitude of the sliding-direction component of the force acting on the slider 37 is larger than the predetermined value (the magnitude of the maximum static friction force).

In the slide restraining device according to the present example, the slider 37 is biased toward the constituting wall 35b of the elongated sliding hole 35 by the twist spring 39 when the slider 37 is located in the end portion R side of the elongated sliding hole 35. The above-mentioned predetermined value (the magnitude of the maximum static friction force) is set by changing the magnitude of the pressing force produced by this twist spring 39.

On the other hand, the twist spring 39 concurrently functions as a slide biasing device for biasing the slider 27 in order to cause the slider 27 to quickly slide from the end portion R side to an end portion L side of the elongated sliding hole 35 when the slider 37 slides along the elongated sliding hole 35 after the slide restraining device releases the slider 37 from the restrained state.

As described above, the center lower box 22 is provided with the spring (whose illustration is omitted) for biasing the lid 24 in the direction of opening the lid 24. Thus, when the lock device 30 unlocks the closed lid 24, the closed lid 24 is biased by the spring in the opening direction, and thus starts to rotate in the opening direction.

In a case where the slider 37 is located in the end portion L side of the elongated sliding hole 35 when the lid 24 starts to rotate in the opening direction, the slider 37 which rotates together with the arm portion 33R is locked by the stopper portion 28. Consequently, the rotation of the arm portion 33R is restrained, and concurrently the opening of the lid 24 is restrained.

<Operation of the Lid Lock Structure of a Storing Box for a Vehicle>

Figure 7A:
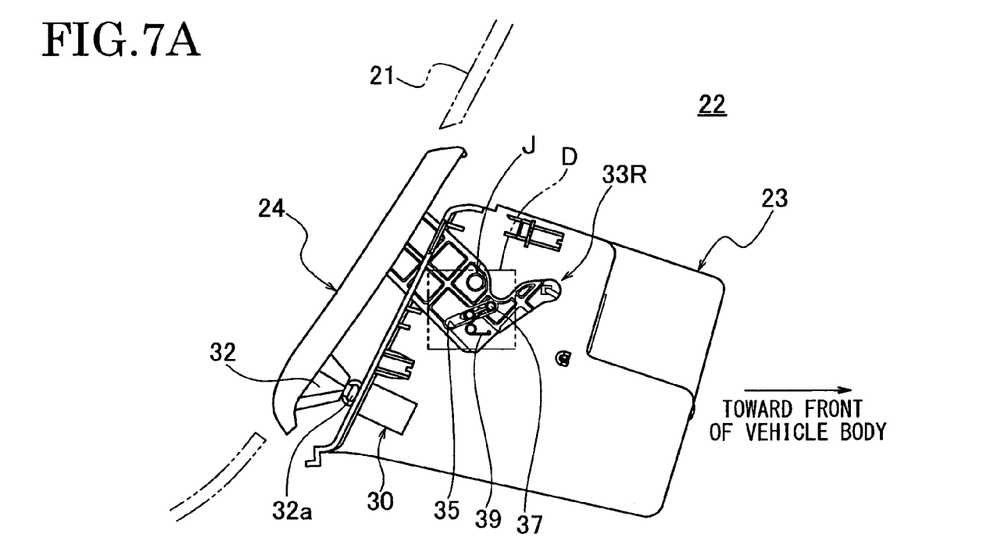
FIG. 7A is an overall view of the center lower box in a normal condition.
Figure 7B:
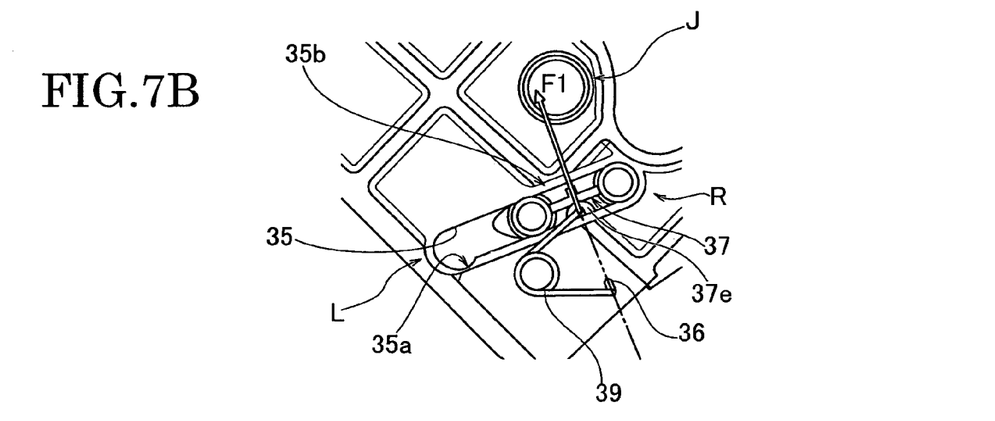
FIG. 7B is an enlarged view illustrating a D part of the center lower box shown in FIG. 7A.

In the lid lock structure of a storing box for a vehicle according to the present example, when the box main body 23 is assembled into the instrument panel 21 of the vehicle, the slider 37 is set in the elongated sliding hole 35 so that the slider 37 is located in contact with an end edge of the end portion R of the elongated sliding hole 35, as shown in FIGS. 7A and 7B.

While the lid lock structure of a storing box for a vehicle of the present example is put in a normal condition in which no impact force is applied to the vehicle, the direction in which the twist spring 39 biases the slider 37 is orthogonal to the direction in which the slider 37 slides (the longitudinal direction of the elongated sliding hole 35). The slider 37 is biased with the pressing force F1 produced by this twist spring 39, and thus is pressed against the constituting wall 35b of the elongated sliding hole 35.

With the slider 37 in this state, even if force in the rearward direction of the vehicle body acts on the slider 37 in the sliding direction of the slider 37, a static friction force working between the slider 37 and the constituting wall 35b restrains the slider 37 from sliding as long as the magnitude of the force acting on the slider 37 is smaller than the above-mentioned predetermined value (the magnitude of the maximum static friction force).

The maximum static frictional force is in proportion to the pressing force from the slider 37 to the constituting wall 35b, or the pressing force F1 of the twist spring 39. For this reason, by controlling the pressing force F1 of the twist spring 39, it is possible to set up the magnitude of force which is needed for the slider 37 to be released from its restrained state when the force acts on the slider 37.

When a passenger on the vehicle presses the closed lid 24 from the front side in order to release the lock by the lock device 30 and open the lid 24, the arm portion 33R rotates about the shaft unit J, and the slider 37 responsively rotates about the shaft unit J as well. For this reason, force such as inertial force and centrifugal force slightly act on the slider 37.

However, this is a case where the lid 24 is pressed for the purpose of releasing the lock by the lock device 30, and thus the inertial force and the centrifugal force acting on the slider 37 are small. In the lid lock structure of a storage box for a vehicle, the pressing force F1 of the twist spring 39 is set so that such levels of the inertial force and the centrifugal force may not release the slider from its restrained state.

In other words, in this case, since the force acting on the slider 37 in the sliding direction of the slider 37 is smaller than the maximum static friction force acting between the constituting wall 35b and the slider 37, this pressing operation does not release the slider 37 from its restrained state.

Figure 7C:
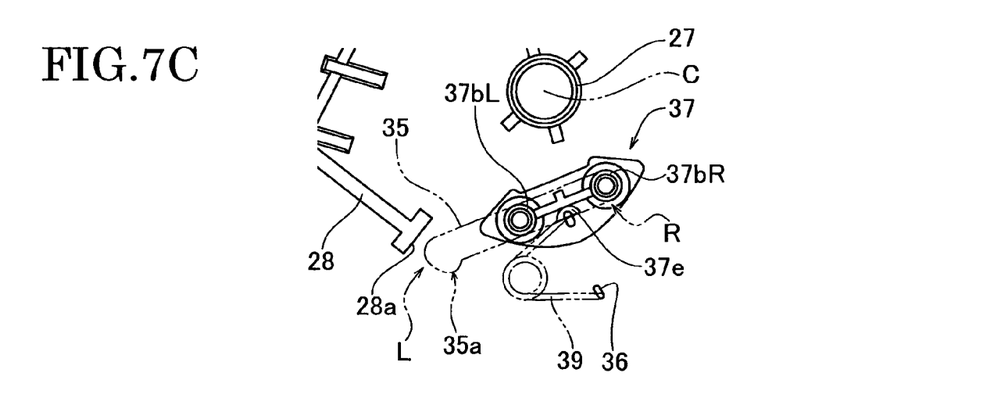
FIG. 7C is a view shown in FIG. 7B, excluding the arm portion.

Accordingly, in this case, as shown in FIG. 7C, the slider 37 is kept in contact with the end edge of the end portion R of the elongated sliding hole 35 while the arm portion 33R rotates about the shaft unit J. In this way, the slider 37 and the stopper portion 28 do not interfere with each other when the arm portion 33R rotates. Accordingly, the opening of the lid 24 is not obstructed.

As a consequence, with the lid lock structure of the present example in the normal condition, if the pressing movement of the closed lid 24 is repeated by pressing its front side, the state of locking the lid 24 and the state of unlocking the lid 24 are alternately repeated.

On the other hand, when the vehicle receives a strong impact force from the vehicle front side due to a collision or the like, the lid lock structure of a storing box for a vehicle of the present example operates so that the opening of the lid 24 is restrained.

Figure 8A:
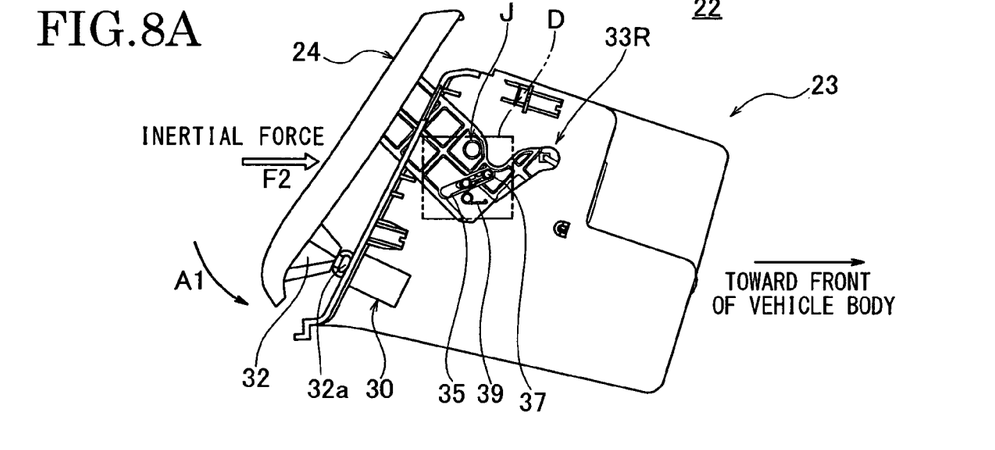
FIG. 8A is an overall view of the center lower box illustrating a moment when an impact force acts on a vehicle body.

As shown in FIG. 8A, when the vehicle body receives impact force from the front of the vehicle by a collision or the like, inertial force F2 working toward the front of the vehicle body is applied to the lid 24 due to the inertia of the lid 24 itself. Accordingly, the lower part of the lid 24 rotates toward the front of the vehicle body, that is, in a direction in which the lock device 30 unlocks the lid 24 (the direction indicated by an arrow A1).

Figure 8B:
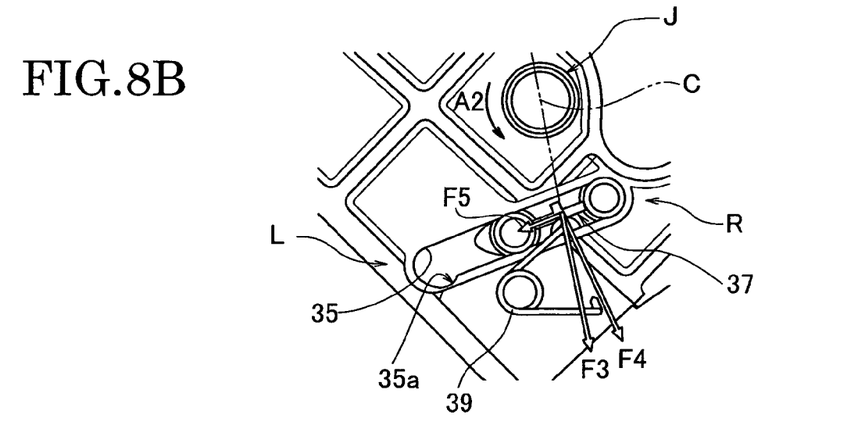
FIG. 8B is a magnified view showing a D part of the center lower box shown in FIG. 8A.

In response to the rotation of the lid 24 by this inertia, the arm portions 33L and 33R of the lid 24 rotate about the respective shaft units J as the rotation shafts in the counter-clockwise direction (in the direction indicated by an arrow A2) in FIG. 8B.

When the arm portion 33R rotates, centrifugal force F3 acts on the slider 37 outward from the center C of the rotation.

Generally, inertial force acting on the lid 24 due to impact force produced by a collision or the like is extremely larger than pressing force with which a passenger presses the lid 24 to unlock the lid 24. For this reason, the centrifugal force F3 acting on the slider 37 as a result of the rotation of the arm portion 33R due to impact force produced by a collision or the like is far larger than force needed for the lid 24 to be unlocked.

When the vehicle collides, as shown in FIG. 8B, a component F4 of the centrifugal force F3 which works in a direction vertical to the sliding direction of the slider 37, acts on the slider 37 against the pressing force F1 produced by the twist spring 39. This reduces pressing force with which the slider 37 presses the constituting wall 35b, and thus decreases the maximum static frictional force.

In addition, although the arm portion 33R rotates due to the impact force produced by the collision or the like, the inertial leaves the slider 37 behind the rotation of the arm portion 33R, in the elongated sliding hole of the arm portion 33r. Concurrently, a sliding-direction component F5 of the centrifugal force F3 acts on the slider 37. For this reason, the slider 37 is released from its restrained state caused by the static frictional force. Thus, the slider 37 starts to slide in its sliding direction from the end portion R to the end portion L of the elongated sliding hole 35.

Figure 8C:
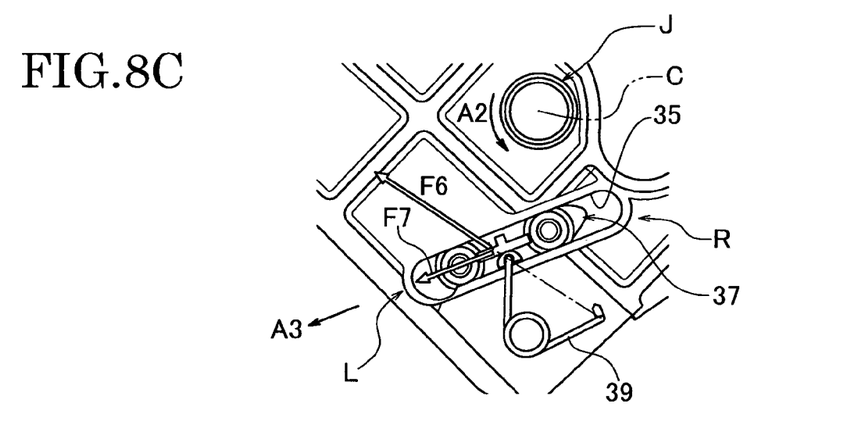
FIG. 8C is an enlarged view of the D part in FIG. 8A, showing how a slider slides along an elongated sliding hole.
Figure 9A:
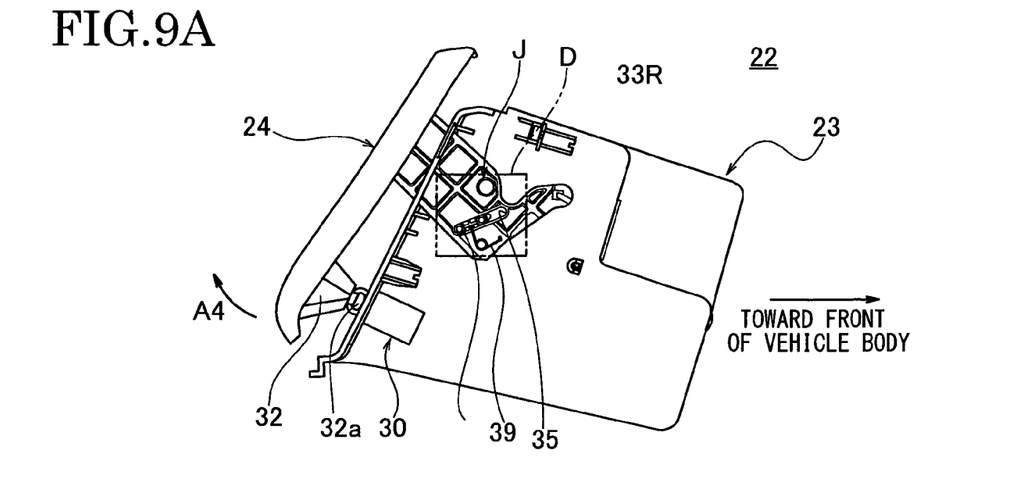
FIG. 9A is an overall view of the center lower box immediately after a lock device unlocks.
Figure 9B:
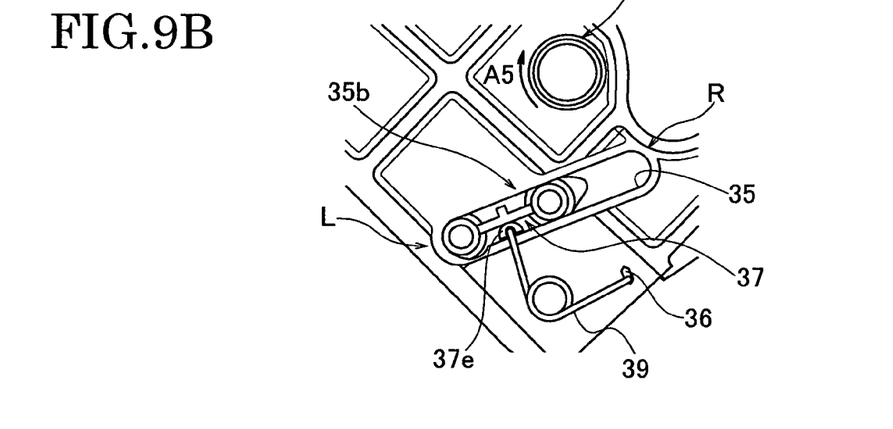
FIG. 9B is a view showing a D part shown in FIG. 9A, in which the slider reaches an end portion of the elongated sliding hole.
Figure 9C:
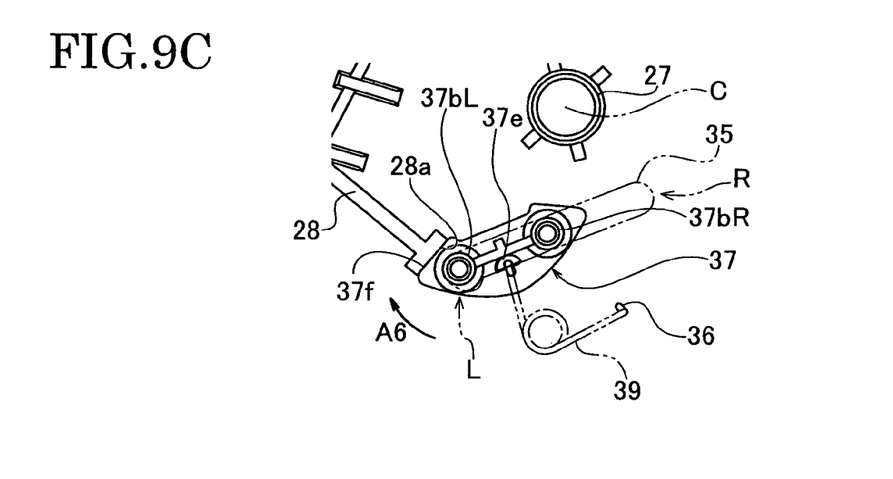
FIG. 9C is a view showing the D part shown in FIG. 9B, excluding the arm portion, in which a rotation of the arm portion is restrained after the slider hits a stopper portion.

As shown FIG. 8C, once the slider 37 starts to slide, the slider 37 is accelerated in its sliding direction (in the direction indicated by an arrow 3A) due to a sliding-direction component F7 of an elastic force F6 of the twist spring 39, and quickly slides and reaches the end portion L of the elongated sliding hole 35. Finally, as shown in FIG. 9A to 9C, the slider 37 hits an end edge of the end portion L, and stops.

When the vehicle collides, the lower part of the lid 24 is pressed toward the front of the vehicle due to the inertial force F2, and thus the lock device 30 unlocks the lid 24. Consequently, immediately after the lid 24 is unlocked, the spring (opening-direction biasing device) causes the lid 24 to start to rotate in the opening direction (in the direction indicated by an arrow A4).

Because the slider 37 slides quickly, the rotational movements of the respective arm portions 33L, 33R in response to the rotation of the lid 24 continue in the direction in which the lid 24 opens (or in the direction indicated by an arrow 5A), even after the slider 37 hits at the end edge of the end portion L of the elongated sliding hole 35 and stops there.

At this time, because the slider 37 is located in the end portion L side of the elongated sliding hole 35, the contact surface 37f of the slider 37 progresses in a direction tangent to the rotation about the rotational center C of the shaft unit J (or in the direction indicated by an arrow A6), and hits at the stopper surface 28a of the stopper portion 28.

Consequently, as shown in FIG. 9C, the slider 37 is locked by the stopper 28. This restrains the slider 37 and the arm portion 33R from rotating to the box main body 23 in which the stopper portion 28 is formed, and accordingly prevents the lid 24 from opening.

<Operation of Return Preventing Concave Portion 35a>

Figure 10A:
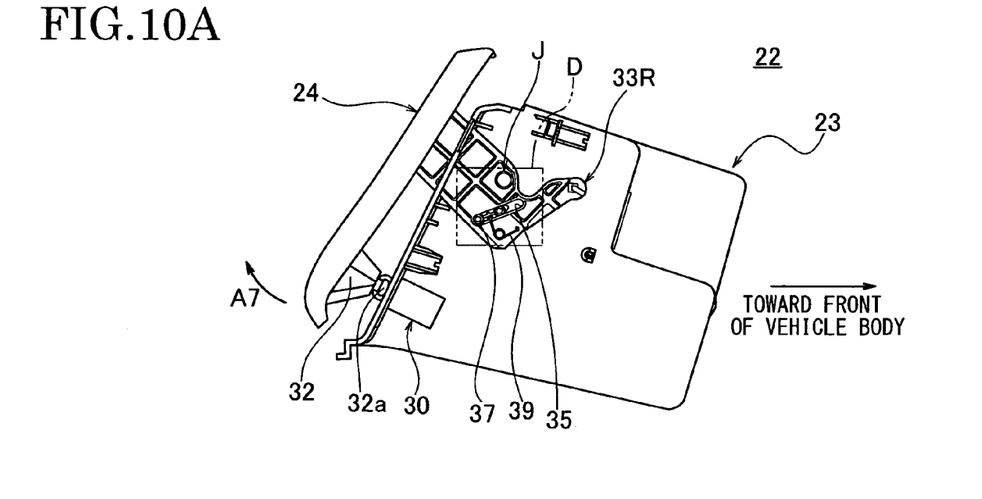
FIG. 10A is an overall view of the center lower box immediately before the slider hits the stopper portion.
Figure 10B:
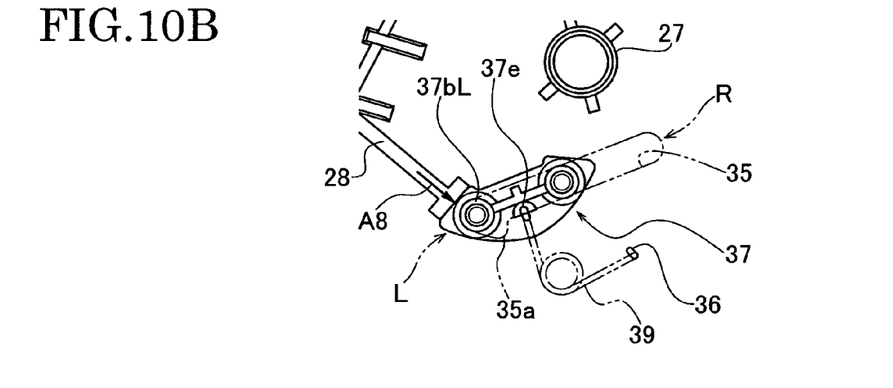
FIG. 10B is a view showing a D part shown in FIG. 10A, excluding the arm portion, in which the slider is pushed back by the stopper portion in response to a rotation of a lid by rotation biasing device.

As shown in FIG. 10, after the slider 37 is locked by the stopper portion 28, the lid 24 continued to be biased by the spring (or the opening-direction biasing device) in the direction in which the lid 24 opens. For this reason, force acts on the lid 24 in the direction in which the lid 24 opens (or in the direction indicated by an arrow A7). On the other hand, as shown in FIG. 10B, pressing force acts on the slider 37 from the stopper portion 28 in contact with the slider 37 in a direction perpendicular to the contact surface 37f (or in the direction indicated by an arrow A8). Consequently, the slider 37 is pushed back from the end portion L to the end portion R of the elongated sliding hole 35.

Figure 10C:
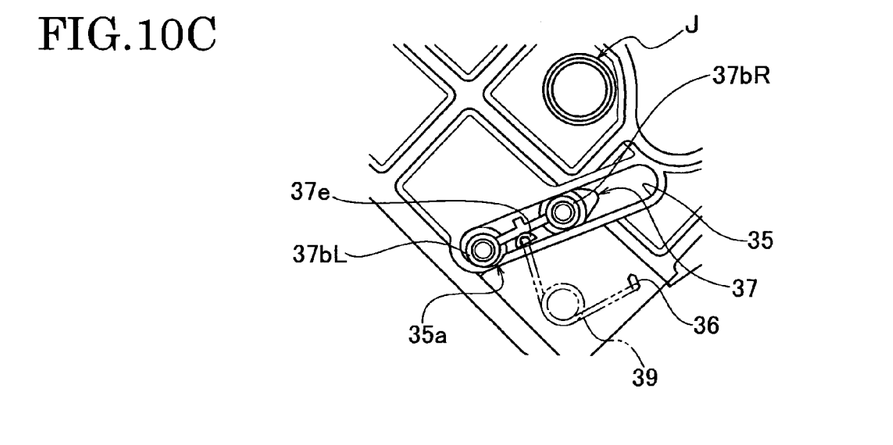
FIG. 10C is a view showing the D part in FIG. 10A, in which the slider is pushed back by the stopper portion, and a cylindrical portion of the slider engages with a return preventing concave portion of the elongated sliding hole, and thereby the return of the slider is prevented.

In the lid lock structure of a storing box for a vehicle of the present invention, as shown in FIG. 10C, the return preventing concave portion 35a is provided in the end portion L side of the elongated sliding hole 35. Consequently, even if the stopper portion 28 is going to push back the slider 37 from the end portion L to the end portion R of the elongated sliding hole 35, the slider 37 is not pushed back, because the cylindrical portion 37bL of the slider 37 is engaged with the return preventing concave portion 35a so that the slider 37 is locked there.

In this way, the slider 37 will not be released from the stopper portion 28, and the lid 24 is thus securely restrained from opening.

The above lid lock structure of a storing box brings about effects as follows. When impact force larger than a particular value acts on the vehicle due to a collision or the like, the lid lock structure thereof causes the slide restraining device and the rotation restraining device to securely prevent the lid 24 from rotating and further from opening. In particular, when impact force larger than a particular value acts on the vehicle due to a collision or the like, the slide restraining device releases the slider 37 from the restrained state. Thus, the slider 37 is biased by the twist spring 39. Thereby, the slider 37 quickly slides from the end portion R side to the end portion L side of the elongated sliding hole 35. Thereafter, while being located in the end portion L side of the elongated sliding hole 35, the slider 37 rotates together with the arm portion 33R in response to the rotation of the arm portions 33L and 33R until the slider 37 hits the stopper portion 28. Subsequently, the slider 37 is locked by the stopper portion 28 so that the rotation of the arm portion 33R is restrained. In this manner, it is possible to prevent the lid 24 from opening due to the impact produced by a collision or the like. In addition, when the impact force larger than the particular value acts on the vehicle due to the collision or the like, the slider 37 is released from the state of being restrained by the sliding restraining device. Thus, the slider 37 is biased by the twist spring 39. Thereby, the slider 37 quickly slides from the end portion L to the end portion R of the elongated sliding hole 35. Thereafter, while being located in the end portion L side of the elongated sliding hole 35, the slider 37 rotates together with the arm portion 33R in response to the rotation of the arm portions 33L and 33R until the slider 37 hits the stopper portion 28. Subsequently, the slider 37 is locked by the stopper portion 28 so that the rotation of the arm portion 33R is restrained. In this manner, the lid lock structure thereof is capable of preventing the lid 24 from opening due to the impact produced by the vehicle collision or the like.

Furthermore, when the maximum value (the above-mentioned "predetermined value") representing the force to restrain the slider 37 is controlled by setting up the slide restraining device, it is possible to easily set up the minimum value (the above-mentioned "particular value") representing such impact force acting on the vehicle that the slider 37 is released from the restrained state.

Moreover, once the slider 37 is released from the restrained state, the slider 37 is biased by the twist spring 39, and thus quickly slides from the end portion R side to the end portion L side of the elongated sliding hole 35. For this reason, the lid lock structure of a storing box for a vehicle of the present example, unlike the conventional example, has no inertia-intrinsic movement characteristic, and therefore is capable of securely preventing the lid 24 from opening by the impact force produced due to the collision or the like, regardless of a level of acceleration inside the vehicle which is produced by the impact force occurring due to the collision or the like.

Additionally, being able to securely prevent the lid 24 from opening, the lid lock structure of a storing box for a vehicle of the present example can prevent articles stored inside the center lower box 22 from coming out and scattering into the vehicle compartment, which in turn eliminates the risk of passengers being injured by the lid 24 and the articles which would otherwise be opened and scattered.

Meanwhile, because the end portion L side of the elongated sliding hole 35 is provided with the return restraining concave portion 35a for preventing the stopper portion 28 from pushing back the slider 37 from the end portion L side of the elongated sliding hole 35 to the end portion R side of the elongated sliding hole 35 when the stopper portion 28 locks the slider 37, the slider 37 is securely locked in the end portion L side of the elongated sliding hole 35 by the stopper portion 28, without being pushed back by the stopper portion 28. Thereby, the rotation of the arm portion 33R is restrained, which in turn securely prevents the lid 24 from opening by impact force produced by a collision or the like.

In the present example, the slide restraining device is designed to release the slider 37 from its restrained state by use of the centrifugal force F3 which acts on the slider 37 in response to the rotation of the lid 24. Nonetheless, the force used for releasing the slider 37 from the restrained state is not limited to the centrifugal force, as long as the slide restraining device restrains the slider from sliding when the magnitude of the force acting on the slider in the sliding direction is not larger than the predetermined value whereas releasing the slider from its restrained state when the magnitude of the force acting on the slider in the sliding direction is larger than the predetermined value. For example, the force may be impact force working toward the rear of the vehicle body which the slider 37 receives from the end surface of the end portion R side, or inertial force working toward the front of the vehicle body obtained in response to impact force from the rear of the vehicle body.

In addition, a mechanism for the slide restraining device is not limited to that of the sliding restraining device of the present example, as long as the mechanism restrains the slider from sliding when the magnitude of the force acting on the slider in the sliding direction is not larger than the predetermined value whereas the mechanism releases the slider from the restrained state when the magnitude of the force acting on the slider in the sliding direction is larger than the predetermined value.

For the present example, the center lower box 22 has been used as an example of the storing box for a vehicle. However, the present invention is applicable to any other storing box provided in the vehicle. For instance, the present invention is applicable to a glove box.

The foregoing descriptions have been provided for the preferable example of the present invention. The present invention is not, however, limited to this example. It should be noted that the example can be changed or modified variously.

What is claimed is:

1. A lid lock structure of a storing box for a vehicle comprising:
   a storing box main body of the storing box for a vehicle, which is provided in a vehicle;
   a lid configured to open and close an opening portion of the storing box main body;
   a lock device for alternately switching states of the lid, while the lid closes the opening portion of the storing box main body, between a locked state in which the lock device locks the lid and a released state in which the lock device releases the lid from the locked state;
   an opening-direction biasing device to bias the lid in an opening direction in which the lid opens when the lock device unlocks the lid;
   paired arm portions for rotatably connecting the lid to the storing box main body;
   an elongated hole formed in at least one of the arm portions, the elongated hole extending in a vehicle front-rear direction while the lid closes;
   a slider attached to the elongated hole to be slidable along the elongated hole;
   a slide restraining device for, when a force acts on the slider in a sliding direction, restraining the slider from sliding if the magnitude of the force acting on the slider is smaller than a predetermined value, and for releasing the slider from the restrained state if the magnitude of the force acting on the slider in the sliding direction is larger than the predetermined value;
   a slide biasing device to bias the slider to cause the slider to quickly slide from a first end side of the elongated hole in its longitudinal direction to a second end side of the elongated hole in its longitudinal direction when the slide restraining device releases the slider from the restrained state; and
   a rotation restraining device to lock the slider which rotates together with the at least one arm portion in response to a rotation of the at least one arm portion, and thereby for restraining the at least one arm portion from rotating in the opening direction in which the lid opens, when the slider is located in the second end side of the elongated hole, wherein,
   when an impact force equal to or larger than a predetermined amount of force acts on the vehicle, the force acting on the slider causes the slide restraining device to release the slider from the restrained state.

2. The lid lock structure of a storing box for a vehicle according to claim 1, further comprising a return preventing device for preventing the slider from being pushed back from the second end side of the elongated hole in its longitudinal direction to the first end side of the elongated hole in its longitudinal direction when the rotation restraining device restrains the slider, the return preventing device being provided in the second end side of the elongated hole.

* * * * *